(12) United States Patent
Miner et al.

(10) Patent No.: US 7,758,927 B2
(45) Date of Patent: Jul. 20, 2010

(54) LASER-INDUCED FABRICATION OF METALLIC INTERLAYERS AND PATTERNS IN POLYIMIDE FILMS

(75) Inventors: Gilda A. Miner, Newport News, VA (US); Diane M. Stoakley, Yorktown, VA (US); Gregory A. Gaddy, Odenton, MD (US); Brent D. Koplitz, New Orleans, LA (US); Steven M. Simpson, New Orleans, LA (US); Michael F. Lynch, New Orleans, LA (US); Samuel C. Ruffner, New Orleans, LA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 104 days.

(21) Appl. No.: 10/956,704

(22) Filed: Sep. 30, 2004

(65) Prior Publication Data

US 2005/0233154 A1 Oct. 20, 2005

Related U.S. Application Data

(60) Provisional application No. 60/564,845, filed on Apr. 19, 2004.

(51) Int. Cl.
*C23C 18/08* (2006.01)
*C23C 18/14* (2006.01)
(52) U.S. Cl. .................. 427/555; 427/98.4; 427/99.4; 264/494; 428/425.9
(58) Field of Classification Search .............. 428/411.1, 428/195, 615 T; 528/353
See application file for complete search history.

(56) References Cited

U.S. PATENT DOCUMENTS

| 3,787,338 A | * | 1/1974 | Skelly et al. ............. 524/291 |
| 4,526,807 A | * | 7/1985 | Auerbach ................ 427/555 |
| 4,968,552 A | * | 11/1990 | Linde .................. 428/195.1 |
| 5,520,960 A | | 5/1996 | Rancourt et al. |
| 5,575,955 A | | 11/1996 | Caplan et al. |
| 5,677,418 A | * | 10/1997 | Thompson et al. .......... 528/353 |
| 6,019,926 A | | 2/2000 | Southward et al. |

OTHER PUBLICATIONS

Walter Caseri, "Nanocomposites of Polymers and Metals or Semiconductors: Historical Background and Optical Properties," Macomol. Rapid Commun, p. 705-722.
Lewis E. Manring, "Electroless Deposition of Silver as an Interlayer Within Polymer Films," Polymer Coummunications, p. 68-71.
Gregory T. Dee, Lewis E. Manring, and Stephen Mazur, "Kinetics of Metal Interlayer Growth in Polyimide Films: Metal Distributions in the Non-Shady-Sate Regime and with Contraints of Patterned Boundaries," J. Phys. Chem, p. 6699-6705.
Robin E. Southward, David W. Thompson, and Anne K. St. Clair, "Control of Reflectivity and Surface Conductivity in Metallized Polyimide Films Prepared via in Situ Silver (I) Reduction," Chem. Mater, 1997 ed., American Chemical Society, (p. 501-510).

* cited by examiner

*Primary Examiner*—James Seidleck
*Assistant Examiner*—Saira Haider
(74) *Attorney, Agent, or Firm*—Helen M. Galus

(57) ABSTRACT

Self-metallizing polyimide films are created by doping polyamic acid solutions with metallic ions and solubilizing agents. Upon creating a film, the film is exposed to coherent light for a specific time and then cured. The resulting film has been found to have a metallic surface layer and a metallic subsurface layer (interlayer). The layer separating the metallic layer has a uniform dispersion of small metal particulates within the polymer. The layer below the interlayer has larger metal particulates uniformly distributed within the polymer. By varying the intensity or time of exposure to the coherent light, three-dimensional control of metal formation within the film is provided.

13 Claims, 5 Drawing Sheets

1μm

1μm

US 7,758,927 B2

LASER-INDUCED FABRICATION OF METALLIC INTERLAYERS AND PATTERNS IN POLYIMIDE FILMS

CLAIM OF BENEFIT OF PROVISIONAL APPLICATION

Pursuant to 35 U.S.C. §119, the benefit of priority of provisional application 60/564,845, with a filing date of Apr. 19, 2004, is claimed for this non-provisional application.

ORIGIN OF THE INVENTION

The invention described herein was made in part by employees of the United States Government and may be manufactured and used by and for the Government of the United States for governmental purposes without the payment of any royalties theron or therefor.

BACKGROUND OF THE INVENTION

1. Field of the Invention

This invention relates generally to polymeric films and coatings. It relates particularly to irradiated, thermally cured polyimide films.

2. Description of Related Art

It has been known for a relatively long time that bulk properties of materials are not necessarily exhibited when reduced in size to the nano-size regime. At least one group of scientists has been researching the metallization of high-performance polymer films containing metallic nanoparticulates in the bulk of the film.

Providing reflective surfaces on exterior surfaces of polyimide films is known in the related art. U.S. Pat. No. 6,019,926 discusses a method of providing reflective, silvered polyimide films via in situ thermal reduction silver (I) complexes. Additionally, technology such as U.S. Pat. No. 5,520,960 relates to electrically conductive polyimides containing silver trifluoroacetylacetonate. U.S. Pat. No. 5,575,955 discusses an electrically conductive polyimide film containing gold (III) ions, composition, and process of making. Additionally, U.S. Pat. No. 5,677,418 shows a method of producing reflective self-metallizing polyimide films.

It should be noted that all these disclosures appear to relate to providing a reflective top surface on a polyimide film. This general technology is referred to as Self-Metallized Film Technology and typically produces a surface metallized flexible polymer film having tunable specular reflectivity and surface electrical conductivity. In fact, it is known that polymers can inhibit the aggregation of metal particles by surface modifications that alter the specific surface energy of the metallic particles and thus their attraction to each other. W. Caseri, "Nanocomposites of polymers and metals or semiconductors: Historical background and optical properties," *Macromol. Rapid Commun* 21, 705-722 (2000).

In Self-Metallized Film Technology, a homogeneous solution containing a soluble metal complex in a polymer resin is cast as a thin film and then subjected to thermal curing. The cure process induces in situ metal ion reduction in the formation of reduced metal clusters that produce a conductive reflective metallic surface layer with additional nanometer-sized metal particulates embedded in the bulk of the film. As long as only a reflective/conductive metallic surface layer is desired, this method is believed to provide a satisfactory method of providing a reflective/conductive metallic surface layer on the polyimide film. Unfortunately, during this process, the metal particulates imbedded within the bulk of the film are dispersed in density gradients of dispersed metallic particulates characterized by non-uniformity in the size of these nanometer-size particles. No continuous subsurface or interlayers are created.

Apparently some work has focused on electroless deposition of silvery interlayers within polymer films. Specifically, L. E. Manring prepared an article entitled "Electroless Deposition of Silver as an Interlayer Within Polymer Films", *Polymer Communications,* 1987, Volume 28, March, pp. 68-71. This document discusses forming a metal layer as an interlayer within polymeric films using counter-current diffusion as opposed to the old method of electroless-deposition. The Journal of Physical Chemistry provided an article in 1987 entitled "The Kinetics of Metal Interlayer Growth in Polyimide Films: Metal Distributions in the Non-Shady-Sate Regime and with Constraints of Patterned Boundaries." *J. Phys. Chem.,* 1987, 91, 6699-6705. This article defined "interlayer" as being known in the art to distinguish the structure from conventional surface-metallized films. The metal in the interlayer in this reference is precipitated from the reaction of dissolved metal ions either with a reducing agent or with mobile electrons. These two components (reducing agent or mobile electrons) are introduced into the film from opposite surfaces. It is believed that the transport of reagents governs the location of the inner layer. This article discusses how one might control the reaction/precipitation process to predict and control electrical and optical properties of the final film product.

These methods of achieving an embedded, or sub-surface, metallic layer involve counter-current diffusion in free standing films. These processes do not typically result in an additional well-adhered surface metallic layer. Furthermore, these processes typically do not provide uniform size and distribution of metallic nanoparticulates in the bulk of the film above and below the interlayer. Finally, films formed by these processes have not been reported to exhibit dimensional changes upon exposure to white light, and the optical properties of these films were not reported in the known references.

While the use of electrical and chemical processes including the use of a reducing agent with mobile electrons is known in the art to produce an interlayer, there is believed to be a need for an improved method of providing an interlayer within polymeric films.

SUMMARY OF THE INVENTION

It is therefore an object of the invention to provide a new method of producing interlayers in polymeric films.

It is another object of the present invention to provide a method of producing a conductive surface layer in addition to an interlayer in a polymeric film.

It is another object of the present invention to provide an improved method for advantageously positioning an interlayer within a film of a polymeric material such as polyimide.

It is another object of the present invention to provide a low cost interferometer using the films disclosed herein.

It is another object of the present invention to write or pattern films having interlayers produced in accordance with a pattern in three dimensions (i.e., depth adjustable for the interlayer as well as two-dimensionally at a given depth).

Accordingly, a polyimide film is produced to provide a metallic upper surface of the film and at least one metallic interlayer below and spaced from the metallic upper surface of the film. The process for producing the film including the metallic upper surface as well as the metallic interlayer includes providing a polyamic acid resin doped with a metallic ion such as a palladium salt. The doped resin was stirred for four hours and stored prior to casting on a glass substrate. A film was formed on a glass substrate and place in a dry box with flowing, dry $N_2$ for 12-18 hours.

In a preferred embodiment, a film was formed on a glass substrate, which was then placed into the path of a Lambda Physik LEXTRA 200 XeF laser (having a 351 nm wavelength of light output). The laser operated at a repetition rate of 10 Hz and an average pulse energy of 30 mJ, pulse length 30 ns and at an intensity of 20 mJ·$cm^{-2}$. The length of time of exposure varied between one and ten minutes. After irradiation, the films were cured using a programmable forced air oven (Blue M model DC-256 C) to remove the DMAc solvent in the polyamic acid and to induce imidization of the polyamic acid and further reduce the palladium ions.

The resulting film included a metallic layer on the upper surface layer and a metallic interlayer, which together may act as an etalon or Fabry-Perot filter. This effect is believed to occur because the resultant Pd/PI film contains two partially transmitting parallel mirrors of similar thickness separated by a gap. Accordingly, such structures may be useful as laser cavities or other commercial applications such as narrow band pass filters and/or microelectromechanical (MEMS) switches.

Additionally, using coherent light from a laser for the irradiation of polymer-doped films provides the advantage of writing or patterning polymer films with minimal exposure times. Varying the exposure time and intensity provides control over the depth of the metallic interlayer or pattern. Precise writing and patterning can also be achieved without a need for masking by incorporating a beam homogenizer in the laser apparatus and by further reducing the amount of solvent in the target polyamic film. Positive-type circuitry may be constructed since the control of the metal layer placement is not accomplished by an etch process, but by a photo-reductive process that selectively forms metal with three-dimensional control. There are believed to be uses in the microelectronics industry for embedded flexible electronic circuitry, interferometers, micro fuses, optically readable 3-D information storage devices and holographic storage media. Antenna patterns and embedded microstructures are also possible in polymer films using the process described herein.

BRIEF DESCRIPTION OF THE DRAWINGS

The patent or application file contains at least one photograph executed in color. Copies of this patent or patent application publication with color drawing(s) will be provided by the Office upon request and payment of the necessary fee.

The particular features and advantages of the invention as well as other objects will become apparent from the following description taken in connection with the accompanying drawings in which.

DETAILED DESCRIPTION OF THE PREFERRED EMBODIMENTS OF THE INVENTION

The Self-Metallizing Film Technology described above relates to the production of surface metallized flexible polymer films having a tunable specular reflectivity and surface electrical conductivity. The existing technology has been found to be satisfactory for providing a one-step method for achieving metallized polymer with superior adhesion at the metal-polymer interface. However, if one were to entertain an interest in achieving mono-dispersed nanoparticulates in the bulk of the polymer, existing processes have been found by the applicant to produce density gradients of the dispersed metallic particulates and non-uniformity in the size of the dispersed nanometer-sized particles.

In an effort to achieve mono-dispersed metal particles in a dielectric polymeric matrix, the applicants entertained the possibility of photo-reduction of metal ions prior to thermal cure. This effort was initially performed in an attempt to control the resulting metallic particle size and the ultimate distribution of metallic particles in the polymeric film. However, the unexpected result of this process was the production of a metallic interlayer wherein two parallel metallic layers are produced separated by a polymeric/nanoparticulate region. In fact, in the preferred embodiment, films formed using the process exhibit movement in response to white light as well as exhibiting optical properties typical of Fabry-Perot filters (or etalons).

Figure 8:
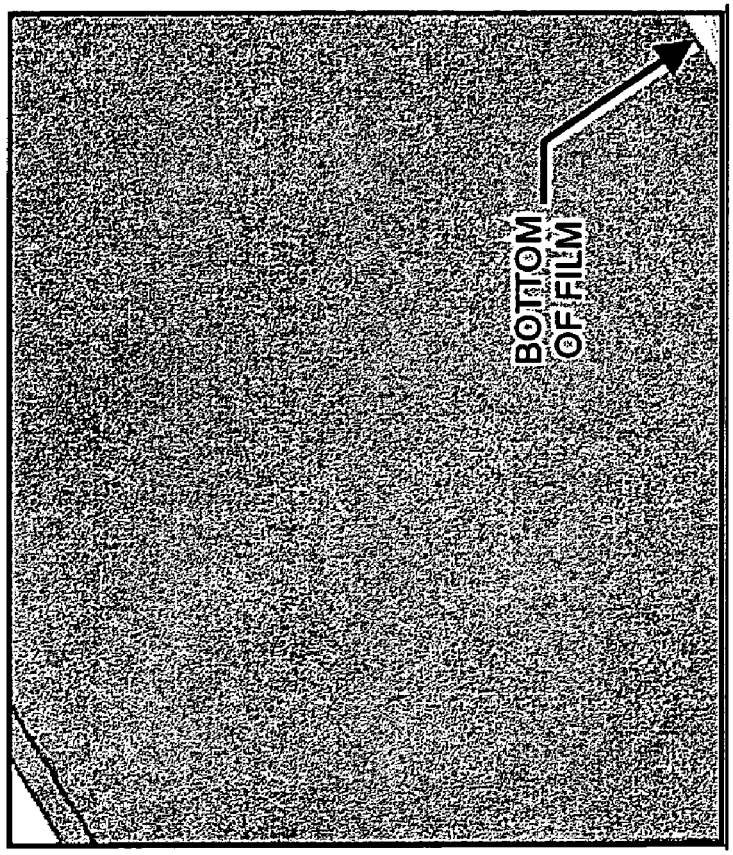
FIG. 8 is a cross section of the irradiated and cured Pd/polyimide film.
Figure 7:
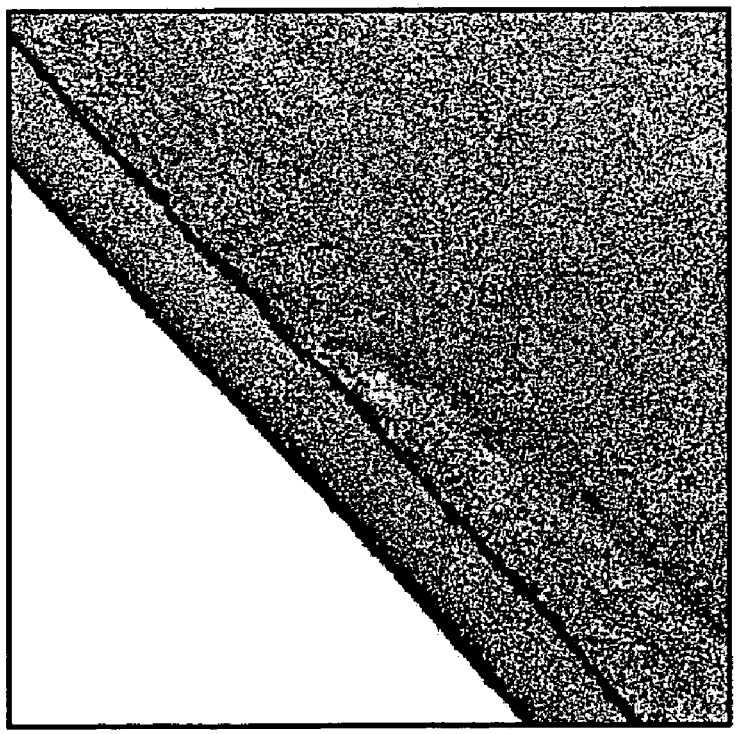
FIG. 7 is a cross section of the irradiated and cured Pd/polyimide film.

As a result of the successes with irradiation with continuous UV light, the applicants discovered that irradiation for many satisfactory embodiments involved irradiating polyamic acid films doped with palladium for greater than ten hours with 350 nanometer photons having an intensity of $10^{17}$ $hvs^{-1}$. The results of irradiation with continuous UV light are shown in FIGS. 7 and 8 which illustrate an upper surface of a continuous metal palladium layer adhering to the upper surface of the palladium film, a layer just below the metallic surface layer consisting of low dielectric, high performance polymer with uniformly dispersed 2-4 nm diameter sized palladium particles, and embedded continuous palladium layer, and another layer of low dielectric, high performance polymer with uniformly dispersed 14-16 nm sized palladium particles below the embedded metal layer.

While the use of UV light is effective at creating an interlayer, the tendency to need to irradiate for a prolonged period of time (such as greater than ten hours) coupled together with the photochemical reactor intensity profile inhomogeneity and reactor size constraints may make the earlier achievement limited in applications.

Accordingly, the applicants substituted the use of coherent light in the form of a pulsed laser to irradiate the film. This reduced the minimal exposure time from hours to minutes with the intensity levels utilized by the applicants. Furthermore, by using lased light, the ability to pattern nanoparticles and create structure within the dielectric bulk polyimide was achieved. Specifically, it was discovered that increasing the length of the coherent radiation exposure time increases the depth of the inter-metallic layer formation within the polymer film, which allows positioning of the metallic patterns.

A wide variety of dianhydrides and diamines could be used within the practice of the present invention. Dianhydrides could include: 3,3',4,4'-benzophenonetracarboxylic dianhydride (BTDA); 4,4'-isophthaloyldiphthalic anhydride (IDPA); 3,3',4,4'-bipheneyltetracarboxylic dianhydride (BPDA); 2,2-bis(3,4'-dicarboxyphenyl)hexa-fluoropropane dianhydride(6FDA); pyromellitic dianhydride (PMDA); 4,4'-oxydiphthalic dianhydride (OPDA); and 4,4'-bis(3,4-dicarboxy)diphenyl sulfide dianhydride. The dianhydrides could also be provided as equivalent tetracarboxylic acids. The diamines could include: pheylenediamine (PDA); benzidine; 4,4'oxydianiline (ODA); 1,3 or 1,4-bis(4-aminophenoxy-4'-benzoyl)benzene (1,3 or 1,4-BABB); 1,3-bis(aminophenoxy)benzene (APB); diaminophenylmethane (MDA); diaminobenzophenone (DABP); diaminophenylsulfone ($DDSO_2$); and 2,2-bis[4-(4-aminophenoxy)phenyl]hexafluoropropane (4-BDAF).

This list is provided for exemplary purposes only, and it should be understood that other dianhydrides and diamines can be used within the practice of this invention. The dianhydrides and diamines can be used to prepare both polyamic acid precursor solutions which contain one or more dianhydrides and one or more diamines and solvent, or solubilized polyimide solutions which contain polyimide prepared from the polyamic acid precursors with the polyimide solubilized in a solvent. It should also be understood that precursors which include both an amine and anhydride moiety can be polymerized by condensation polymerization to produce a polymide.

BTDA and 4,4'-ODA were obtained from Allco Chemical and Wakayama Seika Kogyo, respectively. $PdCl_2$, N,N-dimethylacetamide (DMAc) and dimethyl sulfide were obtained from Aldrich. These chemicals were utilized by the applicant as received without further purification. Polyamic acid resins (12-15% w/w) were prepared by reacting equimolar amounts of BTDA and 4,4'-ODA in anhydrous DMAc. The resin was stirred under a nitrogen ($N_2$) blanket for 15 to 20 hours and then stored at 10° Celsius under nitrogen. $Pd[S(CH_3)_2]_2C_2$ was synthesized from $PdCl_2$ as described by G. Kauffman and D. Cowan in cis- AND trans-DICHLOROBIS(DIETHYL SULFIDE)PLATINUM(II), *Inorganic Synthesis*, 1960, 6, 211-215.

Resins were doped at room temperature with $Pd[S(CH_3)_2]_2Cl_2$ so that the polymer films contained 5 percent by weight (wt. %) palladium (Pd). The doped resins were sealed under nitrogen ($N_2$), stirred for four hours (4 h) and then stored at 10° Celsius. All films were cast on glass substrates at 330 microns thick using a doctor blade or a 2" Gardco Microm Film Applicator. The films were irradiated orthogonally to the sample plane for varying lengths of time with a Lambda Physik LEXTRA 200 XeF laser ($\lambda$=351 nm). The laser operated at a repetition rate of 10 Hz, average pulse energy of 30 mJ, pulse length of 30 nanoseconds and at an intensity of 20 mJ·$cm^{-2}$. A block diagram of the laser apparatus as used is depicted in FIG. 3.

Figure 3:
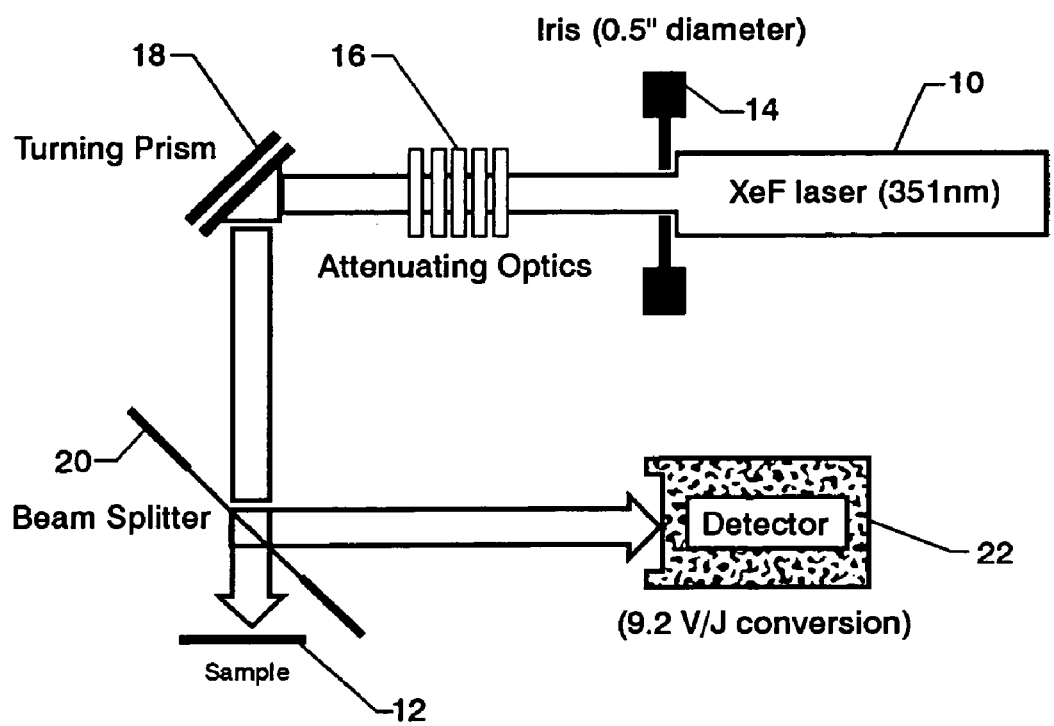
FIG. 3 is a diagram of the apparatus utilized to perform the method in accordance with presently preferred embodiment of the present invention.

A laser 10 provides a source of coherent light which is directed at the film 12 as can be seen in FIG. 3. In the laboratory environment, the laser 10 directed the coherent light through a 0.5" diameter iris 14. The light then proceeded through attenuating optics 16 before being turned by a turning prism 18. The coherent light then proceeded through a beam splitter 20 where the light passed through to contact the film 12 while also being directed to a detector 22 which measured the intensity of the coherent light. While this test embodiment was suitable for the applicants, commercial applications of the applicants method can be adapted as is known to those skilled in the art to allow the method to be practiced to the specifications of the commercial market.

After irradiation, the films were cured using a programmable forced air oven (Blue M model DC-256 C) to remove DMAc solvent, induce imidization of the polyamic acid and further reduce the $Pd^{2+}$ ions. The oven was programmed to heat the samples in successive steps of 100, 200 and 300° Celsius for one hour each returning to ambient temperature over two hours from 300° Celsius.

Figure 4:
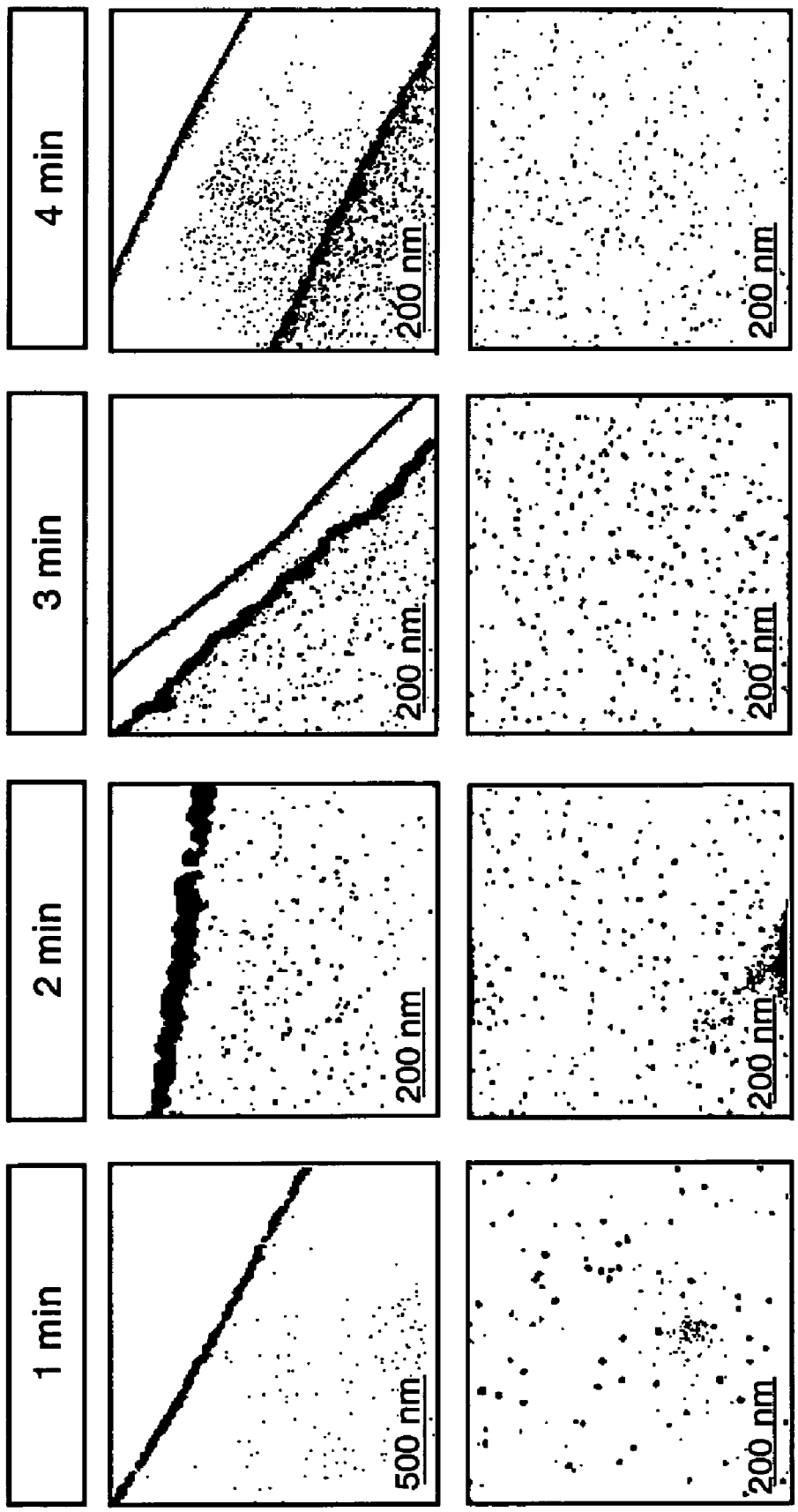
FIG. 4 is a color photograph of cross sections of laser irradiated films taken with a (TEM) illustrating the metallic upper surface layer, the metallic interlayer when formed, and the particulate size differences between the nanometer-sized palladium particles between the metallic layers and those particulates located below the interlayer when formed.
Figure 6:
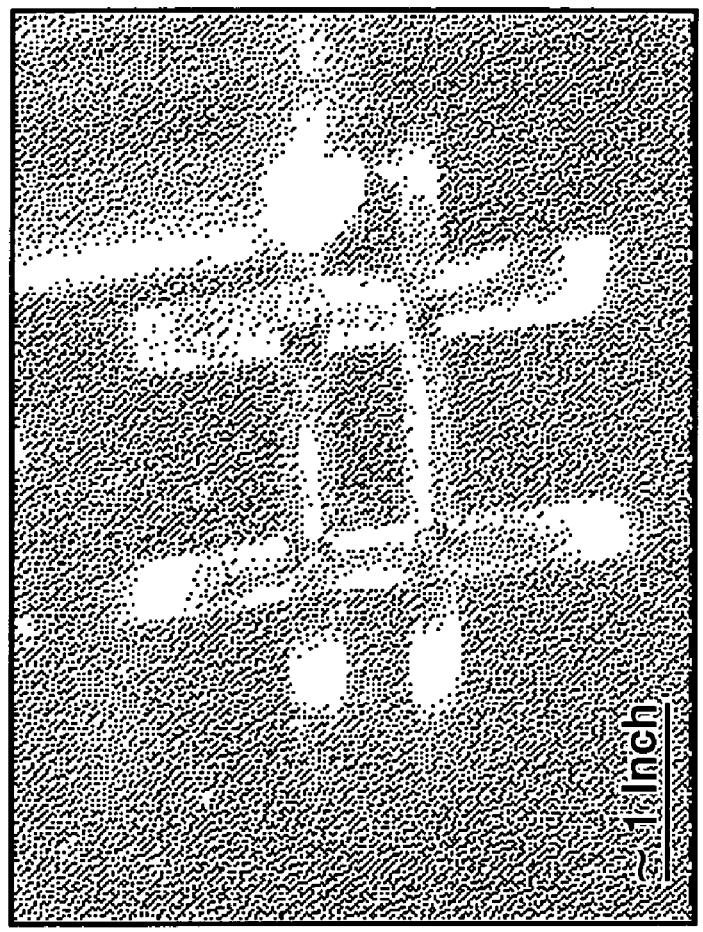
FIG. 6 is a color photograph of Pd/polyimide film patterned in the form of a grid pattern with a laser in accordance with the presently preferred embodiment of the present invention.

The irradiated, thermally cured polyimide films of the present embodiment of the current invention resulted in the polymer films, as shown in FIG. 4. The areas appear to be colored as a result of the formation of an embedded metallic interlayer below the metallic upper surface of the film in FIG. 6. Variations in the distance between the metallic interlayer and the surface metal layer produce a multi-colored appearance resulting from wavelength interference reflections from these two metallic layers. In addition to the appearance of the surface and inter-metallic layers, two distinctly different nanometer-sized palladium (Pd) particles are also produced. Palladium (Pd) particles, 2-4 nanometers (nm) in size, are found dispersed between the metallic surface and interlayer, while palladium (Pd) particles, 14-16 nm in size, are found below the metallic interlayer. See FIGS. 4, 7 and 8.

Figure 1:
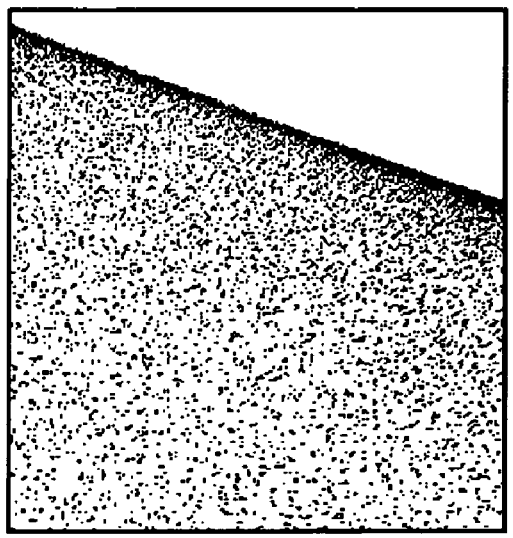
FIG. 1 is a color photograph of a cross-section of film taken with a Transmission Electron Microscope (TEM) illustrating the density gradient of particulates formed in accordance with typical manufacturing techniques when formed under nitrogen.
Figure 2:
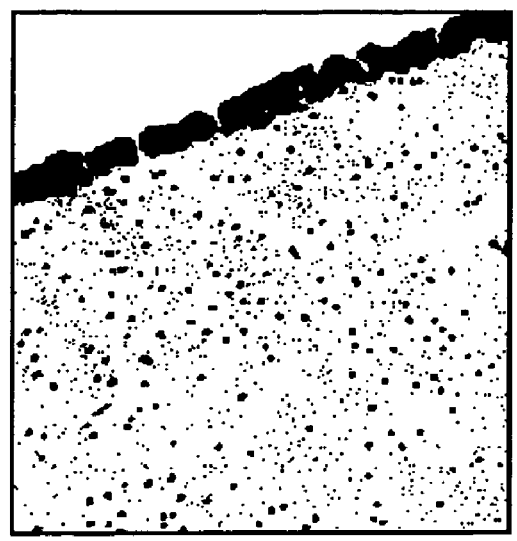
FIG. 2 is a color photograph of a cross section of film taken with a TEM illustrating the lack of uniformity of particulates formed on the surface and within the film in accordance with typical manufacturing techniques when formed under forced air.
Figure 5:
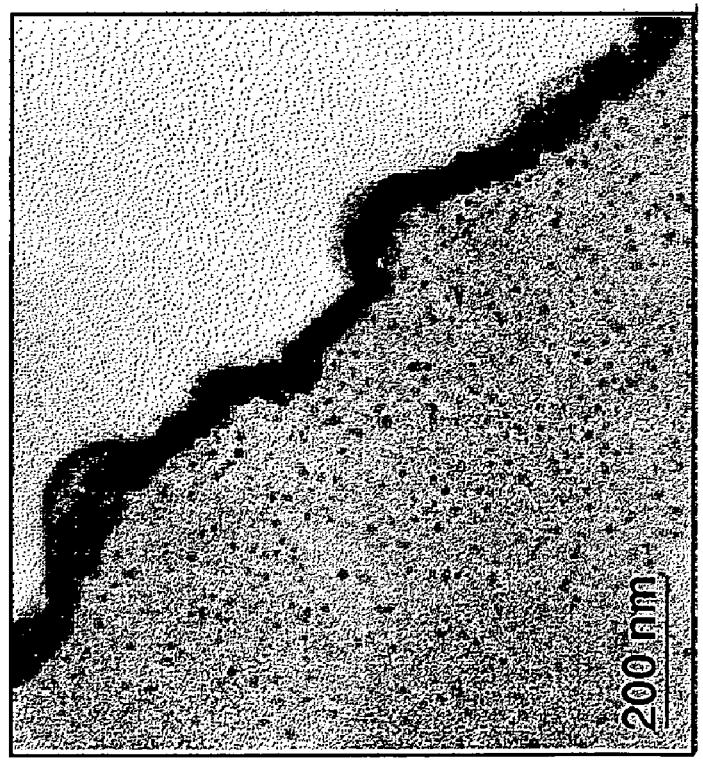
FIG. 5 is a color photograph taken with a TEM of the cross section of a portion of the film outside of the irradiated region of the laser showing that no interlayer was formed in this portion of the film.

The upper surface of the film shown in FIGS. 4 and 5 was observed to be essentially a continuous layer of palladium (Pd). A second essentially continuous layer of palladium was formed internally in the film, just below the surface in FIG. 4. FIG. 5 shows the lack of an interlayer where the photographed portion of the film was located outside of the path of the laser. Referring back to FIG. 4 and the irradiated portions of the film, the distance between the surface and subsurface layers was about 200-400 nanometers and the gap between the layers contained a uniform dispersion of nanometer sized (2-4 nm, dia.) palladium (Pd) particles. (Non-irradiated polyamic acid films doped with palladium ions and thermally imidized only exhibited a continuous metallic surface layer as shown in FIG. 2).

The occurrence of the metallic interlayer creates distinctly different properties than typical palladium/polyimide films having non-irradiated, thermally cured Pd/PI films. The metallic interlayer and the upper surface layer created by first irradiating a polyamic acid film containing solubilized palladium metal ions followed by thermal cure has been shown to provide polyimide films that act as etalons or Fabry-Perot filters. This effect is believed to occur because the resultant Pd/PI film of the present invention provides two partially transmitting parallel mirrors of similar thickness separated by a gap. This behavior likely provides the ability to utilize these materials in lasers and as narrow-bandpass filters. (This claim refers only to the incoherent film technology).

In accordance with the presently preferred embodiment, the BTDA/ODA polyimide films have been found to exhibit a density of 1.38 grams/ml, a glass transition temperature by TMA of 280° Celsius, a dielectric constant at 10 GHz of 3.15, at room temperature (R.T). Tensile strength of 17,000 lbs/$inch^2$, at R.T.; tensile modulus of 420,000 lbs/$inch^2$; a CTE of 39 ppm/° C., a refractive index of 2.69, and an inherent viscosity of polyamic acid at 35° C. of 1.2-1.6 dl/b. The polyimide is further believed to be insoluble in common organic solvents. Other polymer films which are utilized with the method of irradiating and then thermally curing metallic doped resins to produce films may exhibit different physical properties and characteristics.

While $Pd[S(CH_3)_2]_2Cl_2$ is described as the doping agent above, $AgOOCCF_3$ has also been successfully utilized along with $CuOOCCF_3$, $Ni(CH_3COCHCOCH_3)_2$, $Ag(TfA)$, $Au(ptm)$, $Pt[C_2H_5)_2S]_2Cl_2$, $C_5H_5Co(CO)_2$, $Co(CF_3COCHCOCF_3)_2$, $Cu(CF_3COCHCOCF_3)_2$, $Fe(CH_3COCHCOCH_3)_2$, $NaAuCl_2$, $Na^+AuCl_4$, and $(C_2H_5)_3PAuN(Phthal)$ in Self-Metallized Film Technology and could be used in the irradiated, thermally cured polyimide films of the present invention. Combinations of doping agents could also be utilized. Other doping agents as is known in the art could also be utilized. Dopant percentages of about 5 to 20 percent have been tested. Other percentages could also be effective depending upon the desired application.

Naonoparticle dispersions are made with a single-stage self-metallizing protocol. Metal nanoparticle films usually evolve from a single homogeneous resin solution containing a metal precursor (doping agent) that is exposed to coherent radiation and a controlled thermal environment. The combination of thermal curing and coherent light exposure is believed to create a multiphase material comprised of low volume fractions of dispersed metallic clusters (10-20 nanometers (nm) in size) and high concentrations of nanoparticles which form layered embedded films. Examples of the composite have separated inner-layers of increased volume fraction of metal and layer separation is controlled by coherent light exposure. Examples are shown in FIG. 4. These materials exhibit significant absorption in the optical and near infrared (IR) region.

It should be apparent that this technology could represent a significant advance or a breakthrough in the preparation of polymer films with high performance electro-optical characteristics. While palladium (Pd) was the focus of the example, it is believed that other metallics (such as silver, gold, platinum and copper) might provide similar behavior at a lower cost than palladium.

Figure 9:
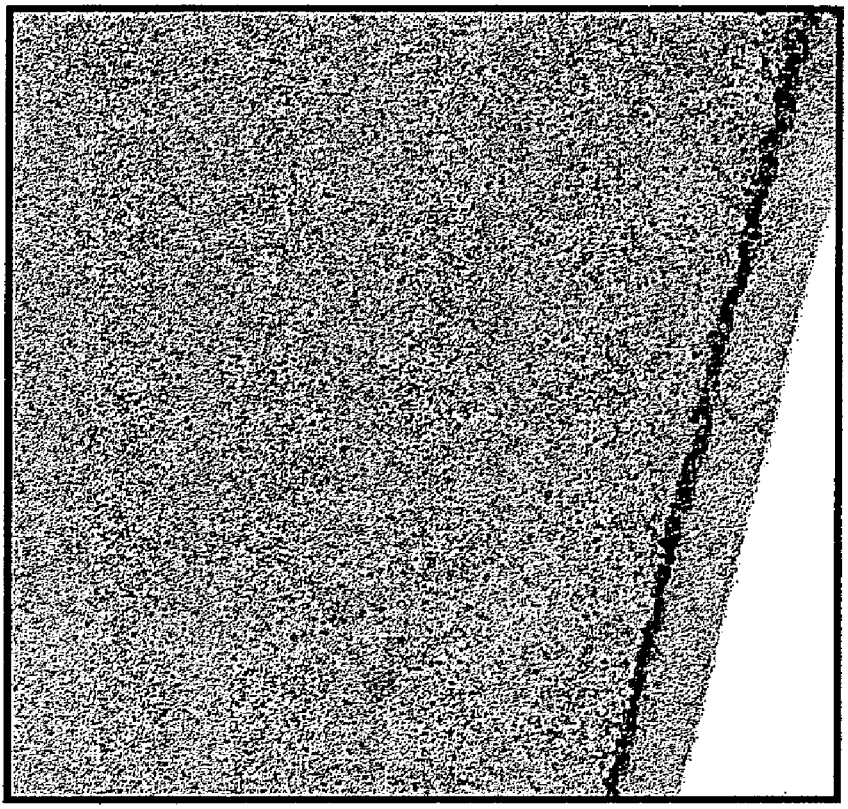
FIG. 9 is cross section of the irradiated and cured Pd/polyimide film showing multiple metal interlayers.
Figure 9:
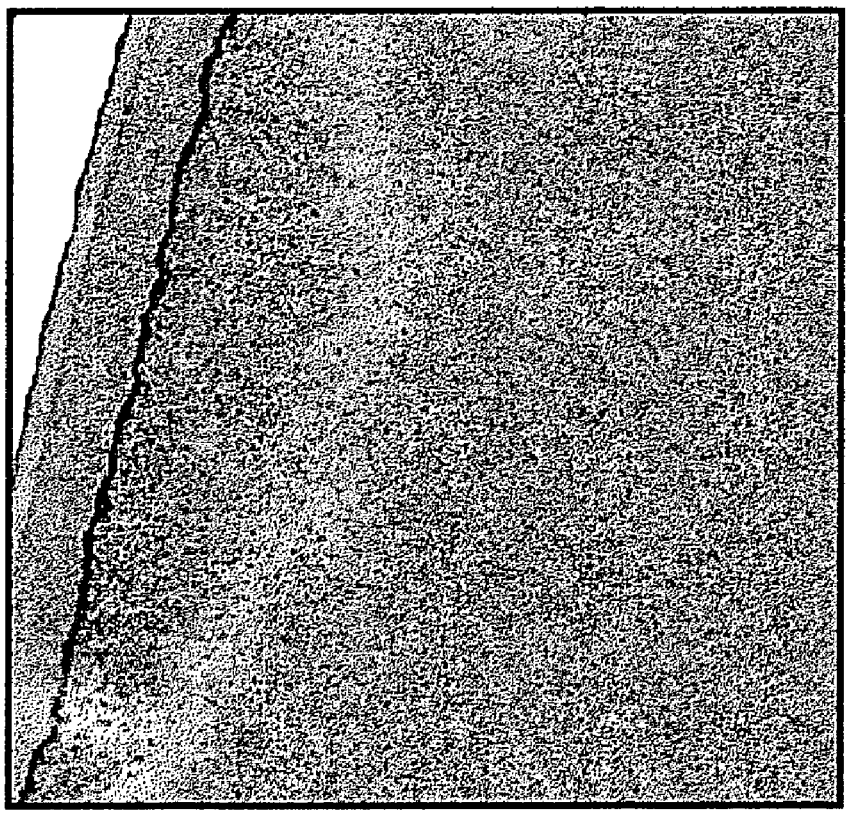

While only a single interlayer is shown in FIGS. 4, 7, and 8, multiple interlayers have been seen in coherent irradiated films (see FIG. 9). Also, it will be understood to one of ordinary skill in the art that films that are irradiated and subsequently cured in a forced air oven (or otherwise) in a free standing mode (not on a substrate as described above), will have a metallic layer on both outer surfaces and interlayers interior to both the upper and lower film surfaces.

When using laser instead of non-coherent UV light, the applicants discovered that interlayer formation could be achieved in the palladium (II) doped polyimide films with an irradiated pretreatment step in about two to four minutes as shown in FIG. 4. Of course, depending upon the particular laser settings, this time could be shortened further or extended. FIG. 4 also shows that palladium (II) doped acid films subjected to irradiation pre-treatments of 4-8 minutes and then thermally cured provided a single continuous metal palladium embedded sub-surface layer or interlayer.

The laser-irradiated, thermally-cured polyimide films of the preferred embodiment resulted in distinct, well-defined palladium metallic pointing the irradiated area (i.e., of a first portion of the film). An interlayer was not found in TEMs taken just outside the laser irradiation region as shown in FIG. 5 (i.e., a second portion of the film). By careful selection of laser parameters, the capability of dramatically lowering the cost of producing interferometers based on polymer films may be realized by utilizing the innovative technique described in this disclosure. As in samples described above, samples generated using the method described exhibit a multi-colored surface arising from the interference of reflected light from the embedded metal layer and reflected light from the film surface such as can be observed in portions of FIG. 6.

The use of coherent radiation offers the advantages of writing or patterning polymer films with minimal exposure times (minutes, or possibly seconds) lending this technology to the possibility of automated production processing. Increased laser intensity could shorten the required exposure time even further. Varying the exposure time and intensity will provide control of depth of the metallic interlayer or pattern. Incoherent radiance has been discovered to take more time (such as fifteen hours or longer) to provide interlayers in polyimide films.

In addition, the use of a high intensity focused beam in the current invention should enable precision writing and patterning without the need for masking. An example of a simple grid pattern is shown in the attached color digital photograph of FIG. 6. This technique is believed to be unique in that it can be used in the microelectronics industry for the printing of micro-circuitry without the need of the current state of the art multi-step fabrication processes. This innovation could eliminate the need for the numerous deposition/etch cycles currently required for micro-circuitry fabrication due to the capability to selectively place metal layers within a dielectric polymer with nanometer scale precision.

Positive-type circuitry could be realized utilizing this technique since the control of metal (layer) placement is not accomplished with an etch process that removes unwanted metal, but by a photo-reductive process that selectively forms metal with three-dimensional control. Of course films produced in accordance with the method herein could be subjected to deposition or etch processes as well, as would be known in the art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A process for the simultaneous formation of a surface and a subsurface metallic layer in polymer films comprising:
reacting an aromatic dianhydride with an aromatic diamine in a solvent to produce a polyamic acid solution;
doping the polyamic acid solution with metallic ions to provide a doped solution;
preparing a film from the doped solution; and then
irradiating a first portion of the film with coherent light of a predetermined intensity and for a predetermined time sufficient to produce a subsurface metallic layer when the film is subsequently cured; and then
curing the film to convert the doped solution to the corresponding polyimide and reduce the metallic ions to precipitate metallic particles within a cured film, wherein the cured film is characterized by a surface metallic layer, and along the first portion of the film the subsurface metallic layer spaced from the surface metallic layer by a first metal particle/polymeric layer intermediate the surface and subsurface metallic layers and a second metal particle/polymeric layer, said subsurface metallic layer located intermediate between the first and second metal particle/polymeric layers.

2. The process of claim 1 wherein the step of curing the film further comprises thermally curing the film to produce the cured film.

3. The process of claim 1 wherein the aromatic dianhydride is 4,4'-benzophenonetetracarboxylic dianhydride (BTDA).

4. The process of claim 1 wherein the aromatic diamine is 4,4'oxydianniline (ODA).

5. The process of claim 1 wherein the solvent is N,N-dimethylacetamide (DMAc).

6. The process of claim 1 wherein the step of preparing the film further comprises forming a film on a substrate.

7. The process of claim 1 wherein the step of irradiating a first portion of the film with coherent light further comprises exposing the film to at least one laser beam directed at the film in accordance with a pattern, said second portion of said film not exposed to irradiation, and wherein the first portion has the subsurface metallic layer, and the second portion lacks the subsurface metallic layer.

8. The process of claim 1 wherein the step of irradiating the film further comprises exposing it to coherent light for less than an hour.

9. The process of claim 8 wherein the step of irradiating the film further comprises varying the intensity and/or time of exposure, wherein a depth of the subsurface metallic layer in the first portion varies with the variance in at least one of the intensity and time of exposure.

10. The process of claim 1 wherein the step of irradiating the film further comprises providing three dimensional control of the placement of the subsurface metallic layer in the first portion by varying the intensity of the coherent light and/or the time of exposure of coherent light to the first portion.

11. The process of claim 1 wherein the metallic ions are provided as a metallic salt containing at least one of silver, gold, palladium, platinum, nickel, cobalt, iron, and copper.

12. A process for the simultaneous formation of a surface and a subsurface metallic layer in polymer films comprising:
   reacting an aromatic dianhydride with an aromatic diamine in a solvent to produce a polyamic acid solution;
   doping said polyamic acid solution with metallic ions to provide a doped solution;
   preparing a film from said doped solution; and then
   irradiating a first portion of said film with coherent light;
   controlling at least one of intensity of said coherent light and an amount of time that said first portion is exposed to said coherent light to produce a subsurface metallic layer at a specified depth in said film when said film is subsequently thermally cured; and then
   thermally curing said film to convert said doped solution to a corresponding polyimide and reduce said metallic ions to precipitate metallic particles within a cured film, wherein said cured film is characterized by a surface metallic layer, and along said first portion of said film said subsurface metallic layer spaced from said surface metallic layer by a first metal particle/polymeric layer intermediate said surface metallic layer and said subsurface metallic layer and a second metal particle/polymeric layer, said subsurface metallic layer located intermediate between said first and second metal particle/polymeric layers.

13. A process for the simultaneous formation of a surface and a subsurface metallic layer in polymer films comprising:
   reacting an aromatic dianhydride with an aromatic diamine in a solvent to produce a polyamic acid solution;
   doping said polyamic acid solution with metallic ions to provide a doped solution;
   preparing a film from said doped solution; and then
   irradiating a first portion of said film with coherent light;
   controlling at least one of intensity of said coherent light and an amount of time that said first portion is exposed to said coherent light to produce a subsurface metallic layer at a specified depth in said film when said film is subsequently thermally cured; and then
   thermally curing said film to convert said doped solution to a corresponding polyimide and reduce said metallic ions to precipitate metallic particles within a cured film, wherein said cured film is characterized by successive layers at said first portion thereof to include
   a surface metallic layer,
   a first metal particle/polymeric layer adjacent said surface metallic layer,
   said subsurface metallic layer adjacent said first metal particle/polymeric layer, and
   a second metal particle/polymeric layer adjacent said subsurface metallic layer.

\* \* \* \* \*